United States Patent
Aono

(10) Patent No.: US 8,681,108 B2
(45) Date of Patent: Mar. 25, 2014

(54) INPUT APPARATUS

(75) Inventor: Tomotake Aono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 594 days.

(21) Appl. No.: 12/670,761

(22) PCT Filed: Jul. 29, 2008

(86) PCT No.: PCT/JP2008/063593
§ 371 (c)(1),
(2), (4) Date: May 6, 2010

(87) PCT Pub. No.: WO2009/017125
PCT Pub. Date: Feb. 5, 2009

(65) Prior Publication Data
US 2012/0274574 A1    Nov. 1, 2012

(30) Foreign Application Priority Data
Jul. 30, 2007    (JP) .................................. 2007-197732

(51) Int. Cl.
*G06F 3/041* (2006.01)

(52) U.S. Cl.
USPC ......................................................... 345/173

(58) Field of Classification Search
USPC ........................... 345/4–6, 173–178, 421–422
See application file for complete search history.

(56) References Cited

U.S. PATENT DOCUMENTS

| | | | |
|---|---|---|---|
| 2005/0099400 A1* | 5/2005 | Lee ................................ | 345/173 |
| 2007/0273663 A1* | 11/2007 | Park et al. ..................... | 345/173 |

FOREIGN PATENT DOCUMENTS

| | | |
|---|---|---|
| JP | 2003-295996 | 10/2003 |
| JP | 2005-141731 | 6/2005 |
| JP | 2005-284592 | 10/2005 |
| JP | 2006-311224 | 11/2006 |

OTHER PUBLICATIONS

Notification of Reasons for Refusal for Japanese Patent Application No. 525,411/2009, mailed Feb. 28, 2012, 4 pages. (including English translation).
International Search Report for PCT/JP2008/063593, mailed on Aug. 26, 2008, 1 page.
JP 2009-525411 JP Office Action dated Aug. 21, 2012.

* cited by examiner

*Primary Examiner* — Sumati Lefkowitz
*Assistant Examiner* — Robert E Carter, III
(74) *Attorney, Agent, or Firm* — Duane Morris LLP

(57) ABSTRACT

An input apparatus 10 has a display unit 11 for displaying a screen composed of a plurality of layers including a first layer for displaying an input area and a second layer for displaying an input area, wherein the second layer is different from that of the first layer, a touch panel 12 arranged in association with the display unit 11 and for detecting an input to an input area, a determination unit 17 for determining an input mode to the touch panel 12, a detection unit 16 for detecting an input to a superimposed area of input areas displayed on the first and second layers and a processing unit 19 for processing, when the input is determined as an input of a first input mode, the input as an input to the input area displayed on the first layer and when the input is determined as an input of a second input mode, the input as an input to the input area displayed on the second layer.

5 Claims, 17 Drawing Sheets

FIG. 12
(a)
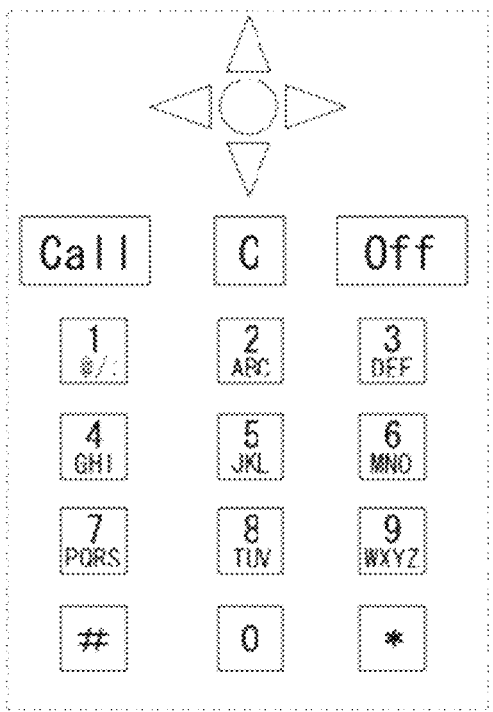
(b)

FIG. 13
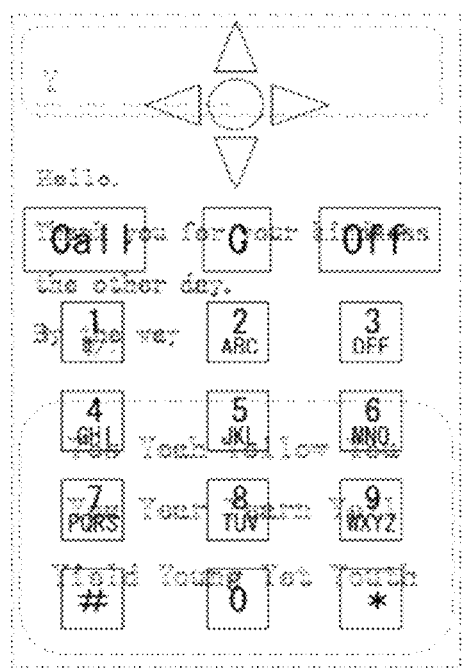
(a)
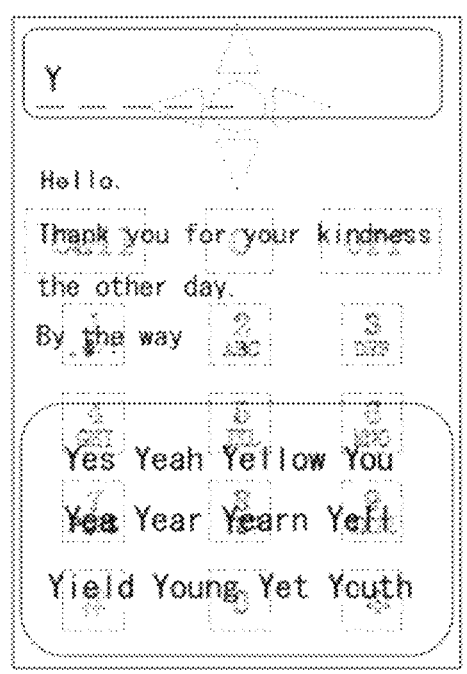
(b)

INPUT APPARATUS

CROSS REFERENCE TO RELATED APPLICATIONS

This application is a U.S. National Phase of International Application No. PCT/JP2008/063593 filed on Jul. 29, 2008, which claims priority to and the benefit of Japanese Patent Application No. 2007-197732 filed on Jul. 30, 2007, the whole contents of which are incorporated herein by reference.

TECHNICAL FIELD

The present invention relates to an input apparatus and, in particular, to an input apparatus having a touch panel.

BACKGROUND ART

For a mobile terminal such as a cell phone, various types of input apparatus used by a user for operating the terminal have been developed according to functions and/or uses of the terminal. Many mobile terminals are designed to accept inputs by operation in which the user directly presses with his finger mechanical keys or buttons that have previously been arranged on the surface of the terminal body.

The mechanical keys of input apparatus of such terminals are usually arranged previously according to the main use of the terminal and in general, the originally-defined physical arrangement of the keys cannot be modified later.

Incidentally, in recent years, small-sized mobile terminals have various functions as in the case of some cell phones having functions such as a digital camera and a music player. Further, some mobile terminals have many accessory functions other than that for the main use of each terminal and, as in the case of the PDA (Personal Digital Assistants: Handheld terminal) or the like, some mobile terminals have a plurality of main uses such as a scheduling management and an address book in one terminal. For such multifunctional terminals, fixed key arrangement may cause a user to feel inconvenience depending on the function to be used when he performs input operation.

In order to solve such operational inconvenience, for example, Japanese Patent Application Laid-Open No. 2006-311224 discloses a cell phone having an input apparatus in which a touch panel is arranged on a front face of a liquid crystal display screen. The input apparatus of the cell phone is designed so that when an operation key or a button displayed as an image on the display screen is pressed, a touch panel corresponding to the pressed position receives the input.

With respect to such a cell phone, since it is possible to display any key arrangement on the display screen and receive input, keys can be arranged freely. Therefore, each time a function of the terminal is changed, the key arrangement can be changed freely depending on the function. Thus excellent operability can be obtained. For example, when using a digital camera function installed in such a cell phone, keys such as a shutter and a zoom are arranged on the position which is convenient for the user to use. In addition, when inputting characters, it is possible to arrange keys like a keyboard of a personal computer by changing the arrangement of keys on a display unit. Such terminals allow a user to perform input operation by optimizing the input apparatus of one terminal to a plurality of functions individually.

However, with respect to a terminal that employs a touch panel as an input apparatus, the whole surface of the touch panel is flat so that each key can be arranged freely. Therefore, the shape of each key and the boundary between the keys cannot be determined by sensing the physical concavity and convexity of the surface of each key by touching it with one's finger, as in the case of an input apparatus having prearranged mechanical keys and buttons for operation. Thus it is generally difficult for the user to do touch-typing using such an input apparatus.

In particular, as shown in FIG. 9, for example, in the case where characters are input to compose an e-mail message by using a two-screen cell phone 100 having a touch panel, an operation key display unit 120 for performing input operation by pressing the touch panel and an information display unit 110 for displaying input process and the result are usually separated. Therefore, in order to input correctly, it is required for the user to watch carefully the key to be pressed on the key display unit 120 each time he presses a key displayed on the touch panel in order to ensure a correct pressing operation. Further, the user needs to turn his gaze to the information display unit 110 that displays the input result to confirm whether or not the input result is reflected as desired. Thus the user needs to turn his gaze constantly from the key display unit 120 to the information display unit 110 and vice versa.

On the other hand, as shown in FIG. 10 for example, compared to the terminal in which an input unit and a display unit are separated, a terminal 200 having only one input/display unit 210 provided with a touch panel in the front of one display unit, as in the case of the PDA, places less burden on the user who constantly needs to turn his gaze between the two displays when performing input. However, for example, in the case where the terminal 200 displays both an input portion for a videophone function and information of address book, or displays keys for composing an e-mail message and further the result of input performed by using the keys, generally the display unit 210 (having a touch panel) displays them by splitting its display into upper and lower parts and the like as shown in the figure. When the display is split in this manner, each display of the display unit 210 is needed to be smaller or a part thereof is needed to be omitted. However, in the case where a terminal body is required to be downsized as in the case of a mobile terminal, the display unit is also subjected to the restriction of size. Therefore, in the case where each of the keys is displayed smaller to increase the number of keys to be displayed on the key display unit, operability may deteriorate.

As an apparatus that can solve such inconvenience, for example, with respect to one input/display unit, Japanese Patent Application Laid-Open No. 2003-295996 discloses a display apparatus which displays an input unit and a display unit by arranging them on the same portion of the screen to be overlapped. According to the display apparatus, the limited display space of the screen can be used effectively without reducing the display of the input unit and the display unit.

The display apparatus displays a predetermined image on a display unit having a touch panel and further superimposes a keyboard image on the image so that the image is visible through the keyboard image. In this manner, since these images are overlapped each other so that both images can be viewed, the user can perform input operation by using the keyboard superimposed. Therefore, with this display apparatus, the user can perform input operation while viewing display of a plurality of layers (superimposed display layers) on the same screen without reducing the display of two screens and switching the display.

However, for this display apparatus, the two display screens are controlled separately as a "display window for setting" and a keyboard window of "numerical keypad". Therefore, the display apparatus does not allow input operation to the display window for setting while the numerical keypad is superimposed on the display window for setting and inputs are accepted by using the numerical keypad. In other words, this display apparatus superimposes two layers one another so that the user can view both layers. However, since the display apparatus controls so that input to only one of the layers is accepted, it cannot deal with a terminal designed to accept an input to both of the layers.

As a method for handling input to a plurality of layers generally known, in the case where a plurality of layers are displayed on a display screen and operation input to one of the layers is accepted, a method in which operation input to a layer is accepted after accepting a choice operation by the user to determine a layer to accept an input as an active layer is known. However, with this method, the user needs to perform the choice operation for choosing a layer to be active each time of changing the input layer. Thus the user is forced to perform cumbersome change operation.

In order to deal with such problem, for example, Japanese Patent Laid-Open No. 2005-284592 discloses a technique for superimposing two screens (display layers) one another on one display apparatus 300 and allowing a user to input to any layer without changing the layer.

The display apparatus 300 described in Japanese Patent Laid-Open No. 2005-284592 can perform a dual-view display in which a plurality of images different from each other are displayed simultaneously in a plurality of display directions corresponding respectively to a plurality of points of view to the same display unit. Thus a plurality of viewers can observe respective images from respective view points, such as, for example, image (b) visible from viewer A and image (c) visible from viewer B. Further, with the display apparatus 300, each viewer can input to the display layer being observed by the viewer. For example, the display apparatus 300 can accept input operations from viewer A to icon A and viewer B to icon B.

SUMMARY OF INVENTION

Technical Problems

However, as for the technique described in Japanese Patent Laid-Open No. 2005-284592, when respective input screens are displayed on each displayer layer (image (b) and (c)), non-superimposing control is performed so that the display position is changed to prevent icons of different layers from being superimposed one another on the same area simultaneously. Further, when the icons are displayed on the same area, control for staggering the timing of each icon is performed so that the plurality of icons will not accept different inputs simultaneously in the same area. Therefore with respect to display of each layer, it is considered that there are some cases where the display position and the display timing are subjected to considerable restrictions when various icons and keys are arranged for display. Under such circumstances, despite displays of layers being superimposed one another for effective use of the display space of the display unit, there is concern that effective use of the display space cannot be done sufficiently with respect to the display position and the display timing such as operation keys and icons displayed in the display space.

Therefore, it is an object of the present invention in view of such circumstances to provide an input apparatus that enables both display unit function and input unit function of the input/display unit having a touch panel can be fully utilized without imposing cumbersome operations on the user.

Solutions to Problems

In order to achieve the above object, the invention of an input apparatus in accordance with a first aspect includes:

a display unit for displaying a screen composed of a plurality of layers including a first layer for displaying at least one input area and a second layer for displaying at least one input area, wherein the second layer is different from the first layer;

a touch panel arranged in association with the display unit and for detecting an input to the input area displayed on the display unit;

an input mode determination unit for determining an input mode to the touch panel;

a superimposed area input detection unit for detecting an input to a superimposed area where the input area displayed on the first layer and the input area displayed on the second layer are superimposed; and an input control unit for processing, in a case where the superimposed area input detection unit detects an input to a superimposed area where the input area displayed on the first layer and the input area displayed on the second layer are superimposed, the input as an input to the input area displayed on the first layer when the input is determined as an input of a first input mode by the input mode determination unit, and the input as an input to the input area displayed on the second layer when the input is determined as an input of a second input mode by the input mode determination unit.

Further, in order to achieve the above object, the invention of an input apparatus in accordance with a second aspect includes:

a display unit for displaying a screen composed of a plurality of layers including a first layer for displaying at least one input area and a second layer for displaying at least one input area, wherein the second layer is different from the first layer;

a touch panel arranged in association with the display unit and for detecting an input to the input area displayed on the display unit;

an input mode determination unit for determining a first input mode to the first layer and a second input mode to the second layer with respect to the touch panel; and an input control unit for processing, when an input is determined as an input of the first input mode by the input mode determination unit, the input as an input to the input area displayed on the first layer, and when the input is determined as an input of the second input mode by the input mode determination unit, the input as an input to the input area displayed on the second layer.

The invention in accordance with a third aspect, the input apparatus in accordance with the first or the second aspect, further includes:

a display control unit for controlling, in response to an input to the input area displayed either on the first or the second layer, display on a predetermined display area of the other layer.

BRIEF DESCRIPTION OF DRAWINGS

FIG. 12 is a diagram showing an English example of a screen displayed on the display unit of the mobile terminal shown in FIG. 1;

FIG. 13 is a diagram illustrating an English example of a screen in which each layer is superimposed one another;

DESCRIPTION OF THE PREFERRED EMBODIMENTS

An embodiment of the present invention will be described below with reference to the drawings. It should be noted that although in the following embodiment, explanation is given by taking a mobile terminal such as a PDA and the like as an example of a terminal having an input apparatus, the input apparatus according to the present invention is not applied to a mobile terminal only, but can be applied to any terminals as well as, for example, a stationary-type input apparatus and the like if it is a terminal having an input unit including a touch panel.

Figure 1:
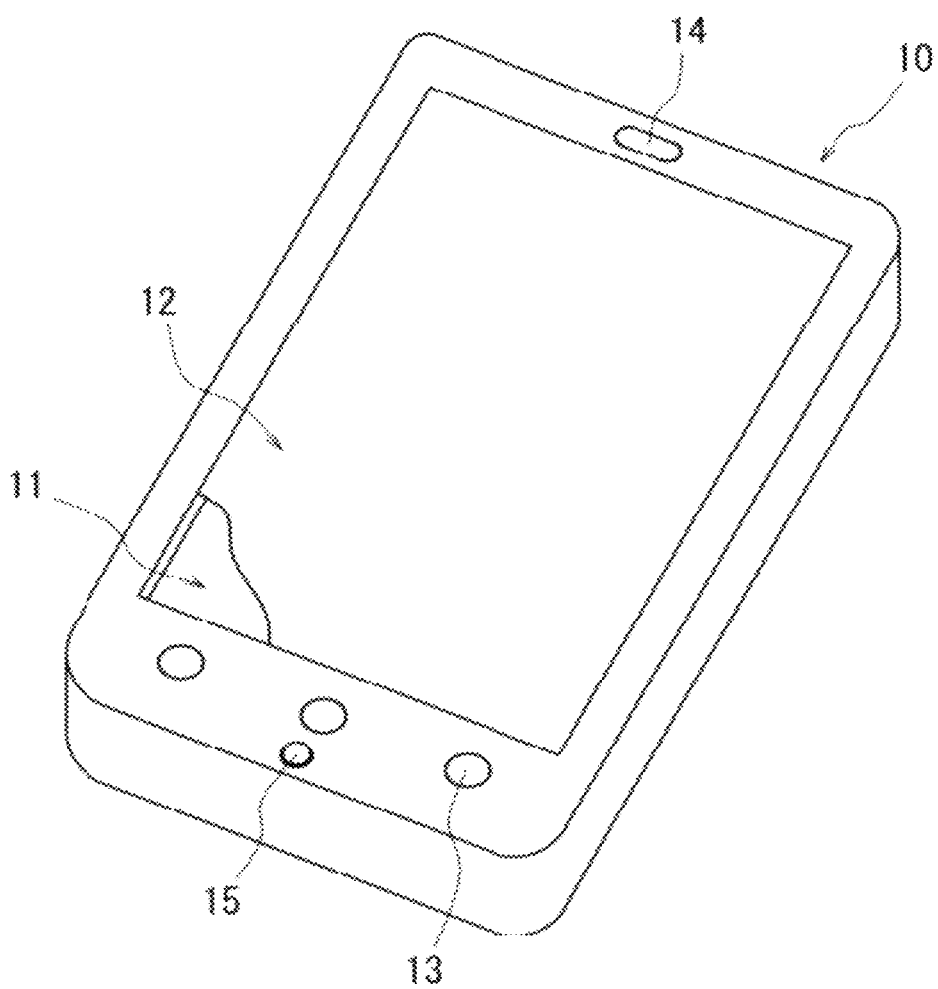
FIG. 1 is a schematic perspective view showing a configuration of a mobile terminal having an input apparatus in accordance with an embodiment of the present invention.

FIG. 1 is an appearance perspective view showing the schematic configuration of a mobile terminal 10 having an input apparatus in accordance with the embodiment of the present invention. The mobile terminal 10 has a display unit 11 on the front side of the terminal body as shown by a notch, for displaying various information and arrangements of keys, buttons and the like by drawing their shapes on a liquid crystal screen, and a touch panel 12 having a matrix switch and the like, which directly accepts inputs by the user's finger and the like and is disposed on the front of the display unit 11. The mobile terminal 10 further includes a key input unit 13 having at least one mechanical key, a speaker 14 for outputting voice and a microphone 15 for accepting input of voice. Other than that, the mobile terminal 10 may include a digital camera function unit, a tuner for one-segment broadcasting, a near-field communication unit such as an infrared communication function unit and various interfaces and the like if necessary. However, drawing and explanation of the details thereof are omitted.

The mobile terminal 10 in accordance with the present invention displays various key shapes and arrangements as images. When the user presses an image portion where a key is displayed, which means, the user presses the touch panel 12 corresponding to the position, a transparent switch on the position where the touch panel 12 is pressed outputs a signal according to the input.

Figure 2:
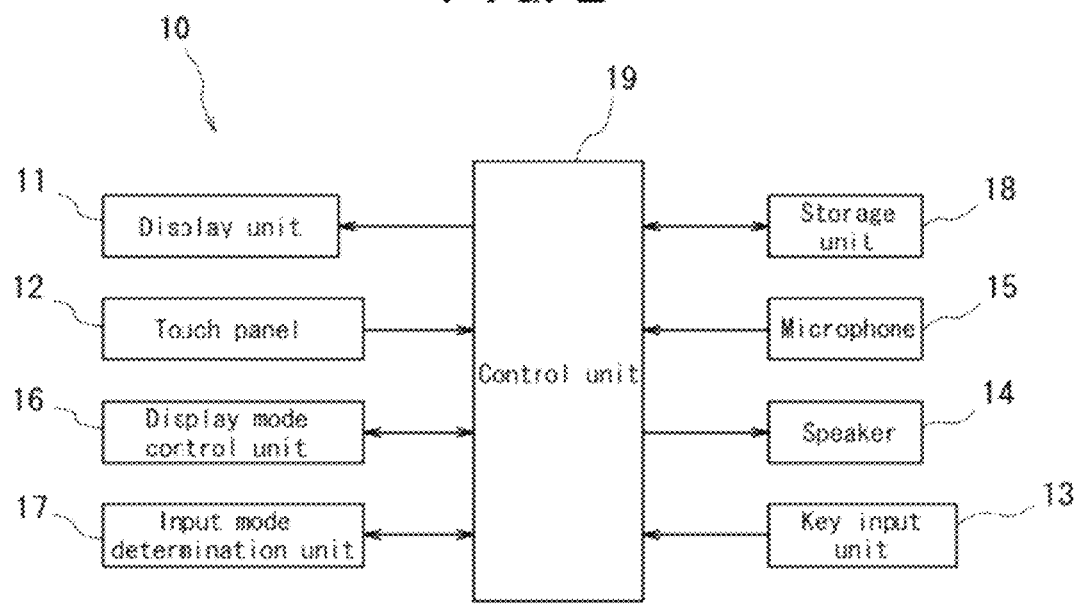
FIG. 2 is a functional block diagram of the mobile terminal shown in FIG. 1.

FIG. 2 is a functional block diagram showing the internal construction of the mobile terminal 10 in accordance with the present embodiment. As described above, the mobile terminal 10 includes the display unit 11, the touch panel 12, the key input unit 13, the speaker 14 and the microphone 15. The mobile terminal 10 further includes a display mode control unit 16 for controlling a display mode such as superimposing an image on the display unit 11 as a layer which is described later, an input mode determination unit 17 for determining an input mode based on an input to the touch panel 12, a storage unit 18 for storing various information such as a plurality of templates used to display the shapes and the arrangements of keys and buttons for input on the display unit 11 according to each application and a control unit 19 for controlling and managing each of these blocks.

Figure 3:
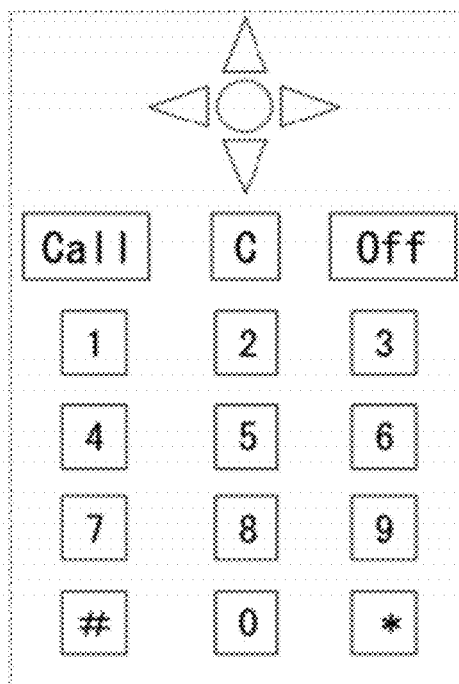
FIG. 3 is a diagram showing an example of a screen displayed on a display unit of the mobile terminal shown in FIG. 1.

FIG. 3 is a diagram showing an example of a screen displayed on the display unit 11 of the mobile terminal 10. Here, as an example, a display mode of the display unit 11 for composing an e-mail message widely used is shown. FIG. 3(a) shows the arrangement of operation key group necessary for composition/edition of e-mail message, which is read out from the storage unit 18 and displayed on the display unit 11 by the control unit 19, and FIG. 3(b) shows a screen for composition/edition of e-mail message. Here, an e-mail composition function is explained as an example. However, the display unit 11 displays the display screen and the easy-to-use key arrangement suitable for the use of the function by reading them from the storage unit 18 based on the various templates according to each function of the mobile terminal 10.

The user inputs characters that compose an e-mail message by pressing the keys of operation key group displayed on the display unit 11 (actually by pressing the touch panel 12) as shown in FIG. 3(a). The input operation of the mobile terminal 10 is described below based on the kana character input method of e-mail that is generally used nowadays. That is, explanation is given based on the method in which each row from "row A" to "row WA" corresponds to respective number keys, such as "row A" to key "1", "row KA" to key "2", "row SA" to key "3" and so on, and by pressing each number key repeatedly, a user can input a character by shifting kana of the corresponding row in order according to the number of presses.

In the display screen shown in FIG. 3(b), an area showing the character conversion process of an e-mail is displayed on the upper part and a confirmed portion of the characters inputted is displayed on the middle part. The figure shows a state where the user presses key "3 (row SA)" once to input "SA", which is the first character of row SA, then presses key "2 (row KA)" three times repeatedly to shift the kana of row "KA" in order to input "KU", which is the third character of row KA. At the lower part of FIG. 3(b), selection candidates of various words starting from "SAKU" are displayed in response to the input of kana characters of "SAKU". The user can decide a word by selecting one candidate among the words.

Figure 9:
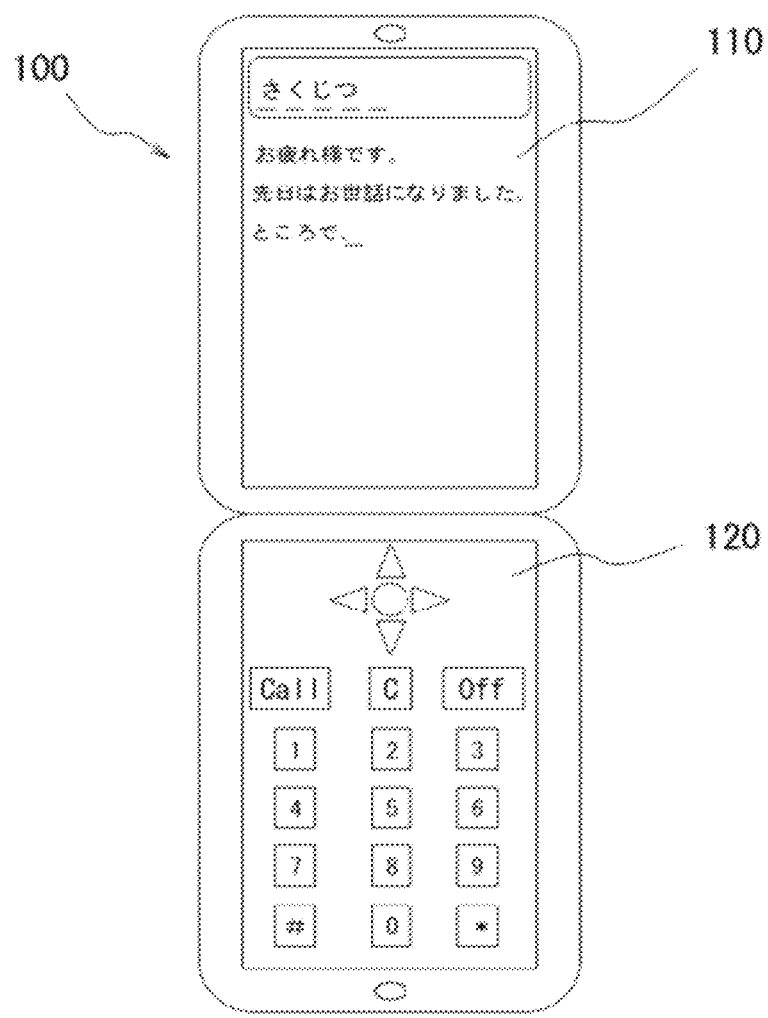
FIG. 9 is a diagram showing an example of a conventional two-screen type mobile terminal.
Figure 10:
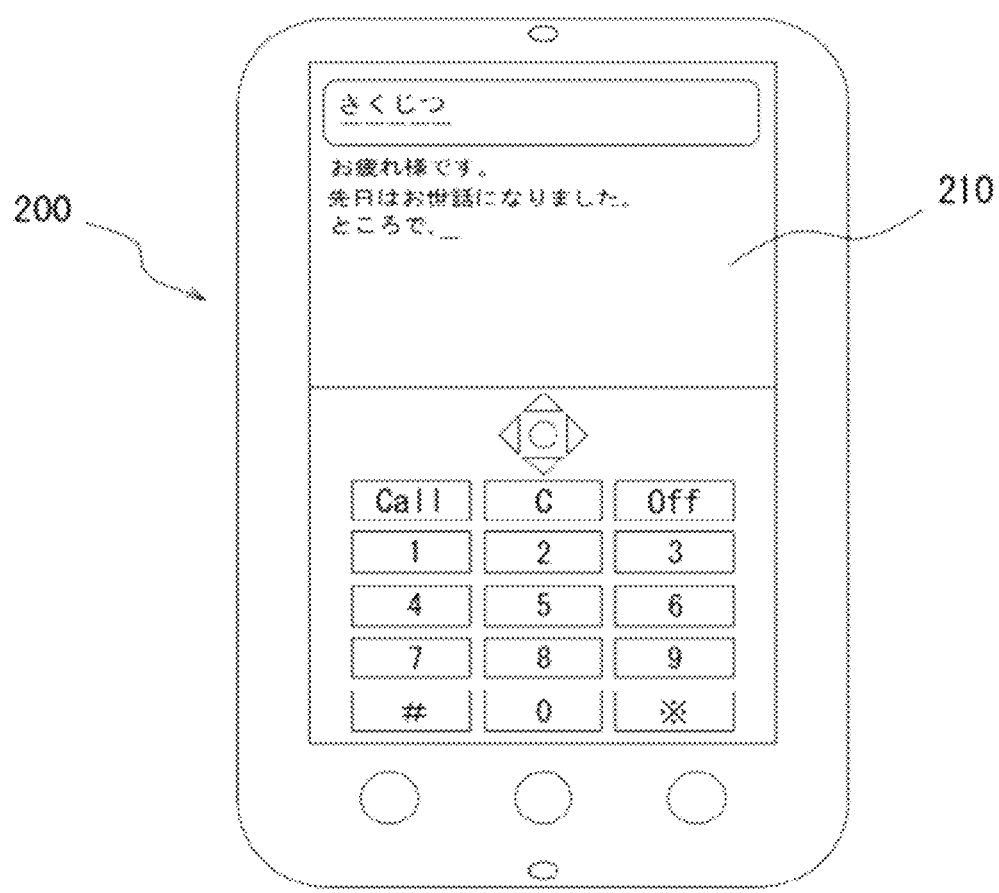
FIG. 10 is a diagram showing an example of a conventional one-screen type mobile terminal.
Figure 11:
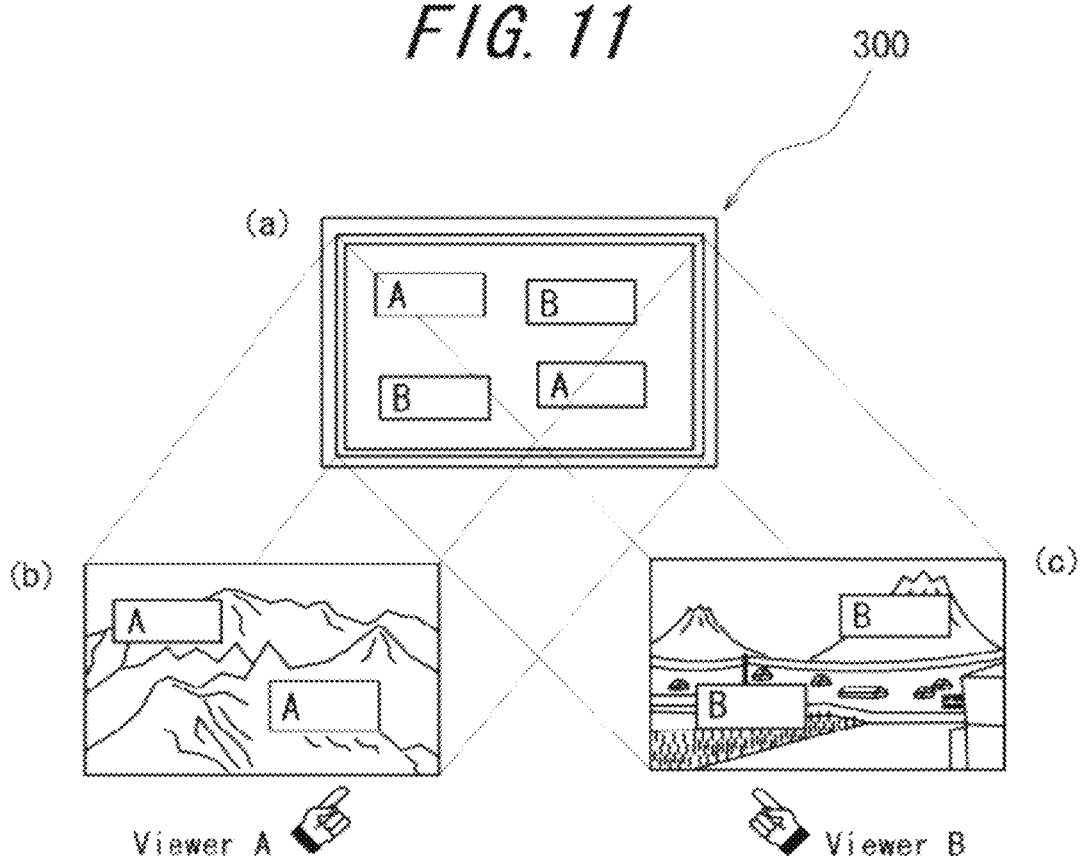
FIG. 11 is a diagram illustrating a method for accepting an input with respect to each viewer in a conventional dual-view display.

When display screens such as shown in FIG. 3(a) and FIG. 3(b) described above are displayed on the display unit 11 of the mobile terminal 10, for example, in case of the mobile terminal having a plurality of display units 110 and 120 as illustrated in FIG. 9, the operation key screen of FIG. 3(a)

may be displayed on the key display unit 120 having a touch panel and the e-mail composition/edition screen of FIG. 3(*b*) may be displayed on the information display unit 110. However, in the case where there is only one display unit 11 as in the case of the mobile terminal 10 of the present embodiment, two screens must be displayed on one display unit. In such a case, as in the mobile terminal 200 of FIG. 10, for example, each screen may be displayed by splitting the display region of one display unit 210. However, when displaying like this, the size of each screen should be reduced for display and the limited display space of the display unit cannot be used effectively, which may remarkably deteriorate the usability of the display unit 11 used as a display unit or an input unit for some functions of the mobile terminal to be used.

Consequently, in the present embodiment, the display mode control unit 16 controls the display unit 110 so that each display screen can be viewed through overlying screen(s) even if a plurality of display screens overlap one another without reducing the size of each display screen. Hereinafter, in the case where a plurality of display screens are superimposed, each display screen constituting the plurality of display screens is conceptually referred to as a "layer". In addition, for convenience of explanation, the display screen on which the operation key as shown in FIG. 3(*a*) is displayed is referred to as an "operation layer" and the display screen on which the operation result as shown in FIG. 3(*b*) is displayed is referred to as a "display layer".

Figure 4:
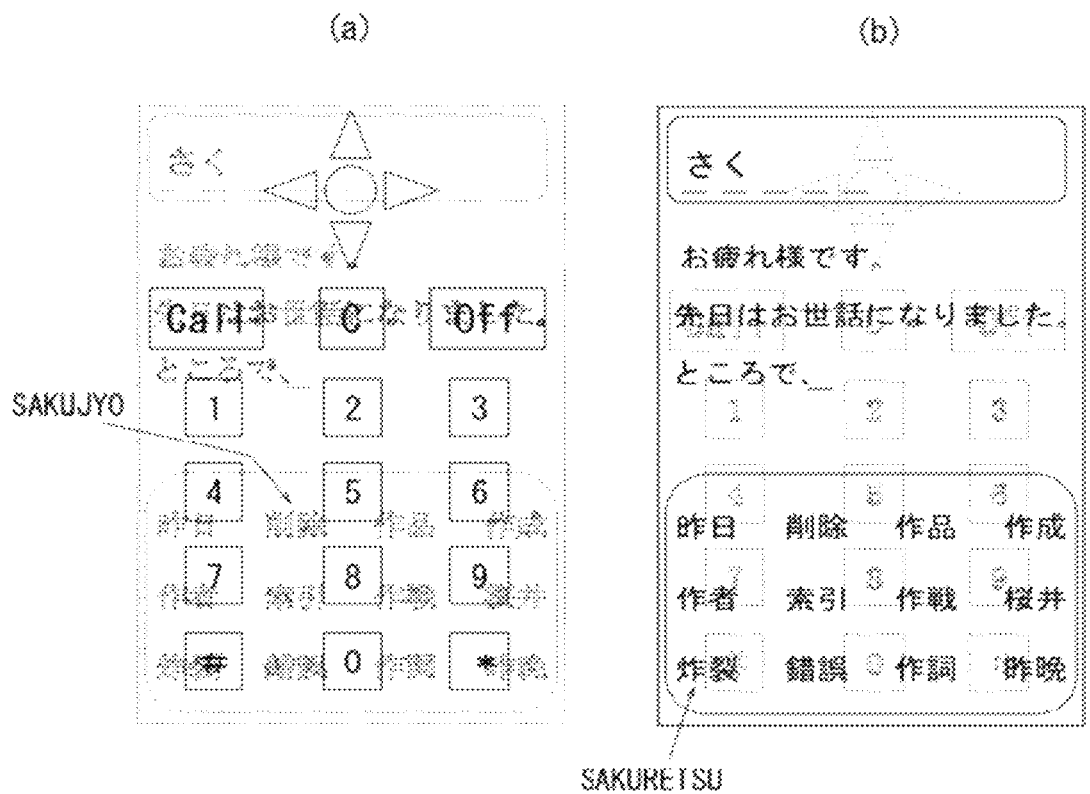
FIG. 4 is a diagram showing an example in which each layer is superimposed one another.

FIG. 4 is a diagram showing an example in which layers shown in FIG. 3(*a*) and FIG. 3(*b*) are superimposed one another. When one layer is overlapped on another layer as it is, the display screen of the lower layer cannot be viewed. Therefore, the display mode control unit 16 superimposes one layer on another so that the lower layer is visible through the upper layer by changing the transparency of the display screen of the upper layer. FIG. 4(*a*) is a diagram showing the display layer superimposed on the operation layer, and FIG. 4(*b*) is a diagram showing the operation layer superimposed on the display layer. In this manner, since both of the two layers can be viewed by superimposing one layer to another, there is no need for reducing the display of each layer. Thus the display space of the display unit 11 can effectively be used without disturbing the layout of each layer.

Further, the display mode control unit 16 controls the display unit 110 to display layers in various modes according to the setting stored in the storage unit 18 when one layer is superimposed on another. For example, the display mode control unit 16 controls the display unit 110 to allow various settings such as an "image transparent ON/OFF" to set previously whether or not to use the above-illustrated function for superimposing an image so that a lower image is visible through the image, a "layer transparency" to set the transparency degree of a layer, a "layer order" to set the superimposing order of a plurality of layers, a "maximum number of superimposed layers" to set the maximum number of superimposed layers and the like. The display mode control unit 16 may be configured such that when the layers exceeding the "maximum number of the superimposed layers" are activated, the layer activated first is hidden, that is, the layer is placed in a sleep mode, and redisplayed by cancelling the sleep mode of the layer when display of another layer is finished. In this embodiment, it is preferable that the layer transparency and the order of the layers are set as shown in FIG. 4(*b*) since a user can operate the operation key if only outline of the arrangement can be viewed. However, it is possible to set the mode for each user to use in the easiest manner corresponding to each function of the mobile terminal 10.

As described above, when layers are superimposed, if icons, buttons, keys and the like, which are input areas displayed on the layers, do not overlap each other on the same position of the plurality of layers, input operation to each layer can be accepted without any particular problem. However, in the case where input areas overlap each other on the same position of the plurality of layers, if the user presses the position of the input area, the touch panel 12 cannot determine to which layer's input area superimposed the input is intended.

In other words, in FIG. 4, for example, with respect to key "3" and the character of "SAKUJYO" among the selection candidates, it is possible to determine correctly to which layer's input area the input is intended based on the position where the input is performed on the touch panel 12 since the position of input area does not overlap on each layer if the press operation is performed on either a layer shown in FIG. 4(*a*) or a layer shown in FIG. 4(*b*). However, for key "#" and the character of "SAKURETSU" among the selection candidates, since they locate almost at the same position on the touch panel 12, if the press operation is performed on either a layer shown in FIG. 4(*a*) or a layer shown in FIG. 4(*b*), there will be some cases where to which input area the input is intended cannot be determined based on the pressed position.

Therefore, in the present embodiment, the mobile terminal 10 performs "multi-layer operation processing" which enables determination of an input as an input to a predetermined input area even if input areas of the plurality of layers overlap each other when the plurality of layers are superimposed.

The multi-layer operation processing by the input apparatus of the mobile terminal 10 in accordance with the present embodiment will be described below with reference to the flowchart shown in FIG. 5. It should be noted that the multi-layer operation processing is performed on the basis that a plurality of layers are superimposed one another on the display unit 11. In addition, input modes are stored previously in the storage unit 18 so that the input mode determination unit 17 can determine to which layer the input is intended when the user performs input to an input area on the touch panel 12.

With respect to the input modes referred to here, there may be various modes such as a normal one-time press input, a long press input, a quick double-click input, an input such as sliding one's finger while pressing, an input by flicking one's finger and an input by tracing one's finger around an icon to be chosen. Particularly, the input by sliding one's finger can be handled as a separate mode according to the sliding direction (e.g. the slide from up to down is handled as a first input mode, and the slide from down to up is handled as a second input mode). Correspondence between each of these input modes and each layer is previously stored in the storage unit 18.

First, when an input to a portion of touch panel 12 corresponding to an input area displayed on the display unit 11 is detected at step S11, the control unit 19 determines whether or not the position of the input area where the input is detected overlaps another among a plurality of input areas on the plurality of layers displayed with reference to the key arrangements of each layer stored in the storage unit 18 (step S12). Even if there is a plurality of layers, when there is no overlap with the input area, it is considered that the user intends to input to the input area. Therefore, the control unit 19 performs a corresponding process assuming that the input is performed to the input area (step S13).

In the case where the position of the input area where the input is detected overlaps an input area of another layer at step S12, the control unit 19 determines to which layer the input is performed based on the information of the input mode determined by the input mode determination unit 17, and performs processing assuming that the input operation is performed to the input area of the layer indicated by the determination result (step S14).

Figure 6:
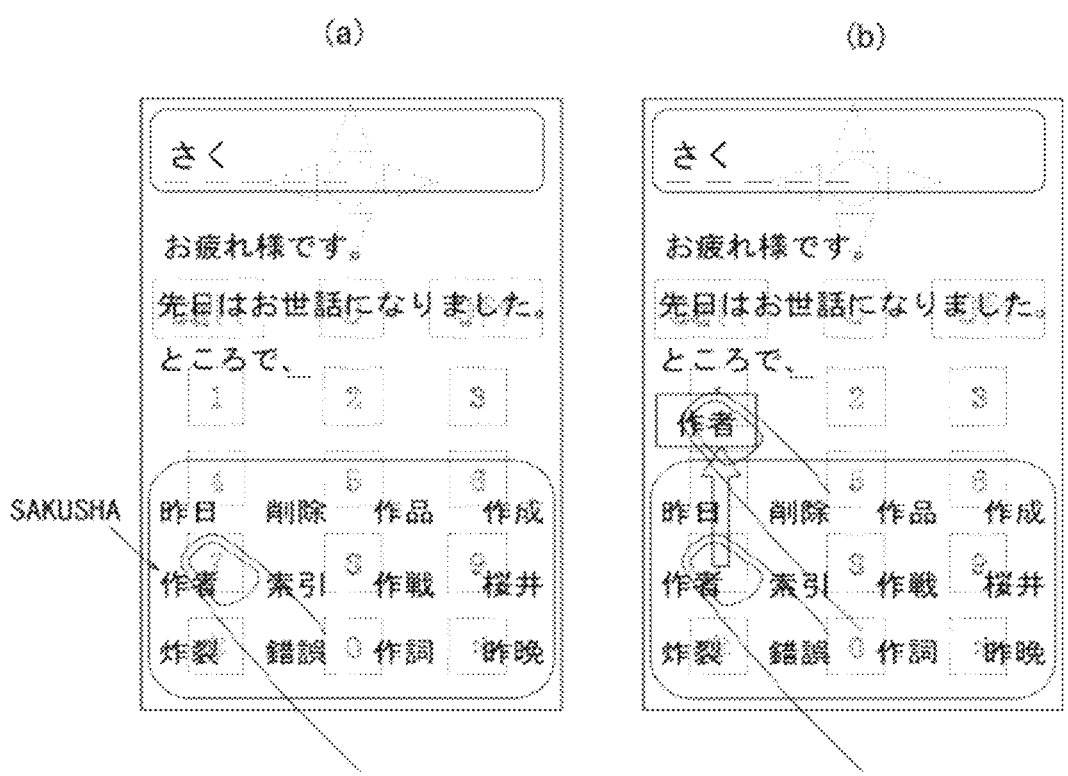
FIG. 6 is a diagram illustrating an example of an input method with respect to each layer of the input apparatus of the mobile terminal shown in FIG. 1.

Therefore, with respect to the portion where input areas overlap each other, for example, in the case where a normal one-time press is set as an input to the operation layer, if the user desires to perform input to key "7" as shown in FIG. 6(*a*) and performs input by pressing key "7" once, the control unit 19 processes the input as an input of "7" to the operation layer based on the determination by the input mode determination unit 17. In addition, for the portion where the input areas overlap each other, in the case where an input by sliding one's finger while pressing is set as an input to the display layer, if the user desires to choose the word of "SAKUSHA" and performs input by sliding his finger on the position where "SAKUSHA" is displayed as shown in FIG. 6(*b*), based on the determination by the input mode determination unit 17, the control unit 19 processes the input as a choice of "SAKUSHA" on the display layer. Therefore, in the present embodiment, an input mode determination unit is configured by including the input mode determination unit 17 and the storage unit 18. Further, a superimposed area input detection unit is configured by including the touch panel 12, the display mode control unit 16 and the control unit 19. The control unit 19 also includes an input control unit.

In this manner, in the present embodiment, for the input areas of a plurality of layers located on the same position with respect to the touch panel 12, a user can input to any layer directly by performing the input operation differently for each layer regardless of a state of the superimposed display on the display unit 11 (whichever layer is displayed on top). Therefore, neither choice of a layer to be activated each time an input is performed nor switching of a layer is necessary anymore.

In the present embodiment, a result based on input to a layer can be displayed by reflecting it on another layer, for example, the result of the input to the "operation layer" is reflected to the display on the "display layer". For example, when key "1 (row A)" is pressed on the operation layer, the control unit 19 first controls the operation layer to make a confirmation display indicating that "1 (row A)" is pressed (e.g. momentary highlighting), and then, performs processing to output the character "A" on the display layer based on the input. Therefore, in the present embodiment, a display control unit includes the display mode control unit 16 and the control unit 19.

Moreover, in the case where various selection candidates of words are displayed on the lower part of the display layer in response to the input of kana characters and the user selects one from the candidates at the stage of composition of e-mail as shown in FIG. 6, in the conventional method, the user normally selects a conversion candidate of kana characters using an arrow key displayed on the upper part of the operation layer. However, in the mobile terminal 10 in accordance with the present embodiment, a plurality of layers are superimposed one another and a user can input to a layer directly. Thus the user, when selecting a candidate as described above, can directly select one from the selection candidates by performing input in an input mode corresponding to the display layer. Therefore, the user can make full use of the merit of using an input unit having a touch panel.

Further, in case the input mode determination unit 17 cannot determine which layer a mode of input performed by the user corresponds to, a priority of input to each layer can be set previously. In other words, for example, in the case where the normal one-time press operation is determined as an input to the operation layer and the slide input is determined as an input to the display layer, when the input mode determination unit 17 cannot determine whether the user input is one-time press or slide input, it is possible, for example, to previously perform setting so that the user input is determined as an input to the display layer first. Moreover, in the case where a mode of an input operation to the layer appeared first is set as a normal one-time press, for example, the mode of the input operation to the layer appeared next is different from the normal one-time press. Therefore, in the case where an input cannot be recognized as a normal one-time press which is considered to be determined easily, it is possible to set so that the input is determined to be an input to the layer appeared later first.

Figure 7:
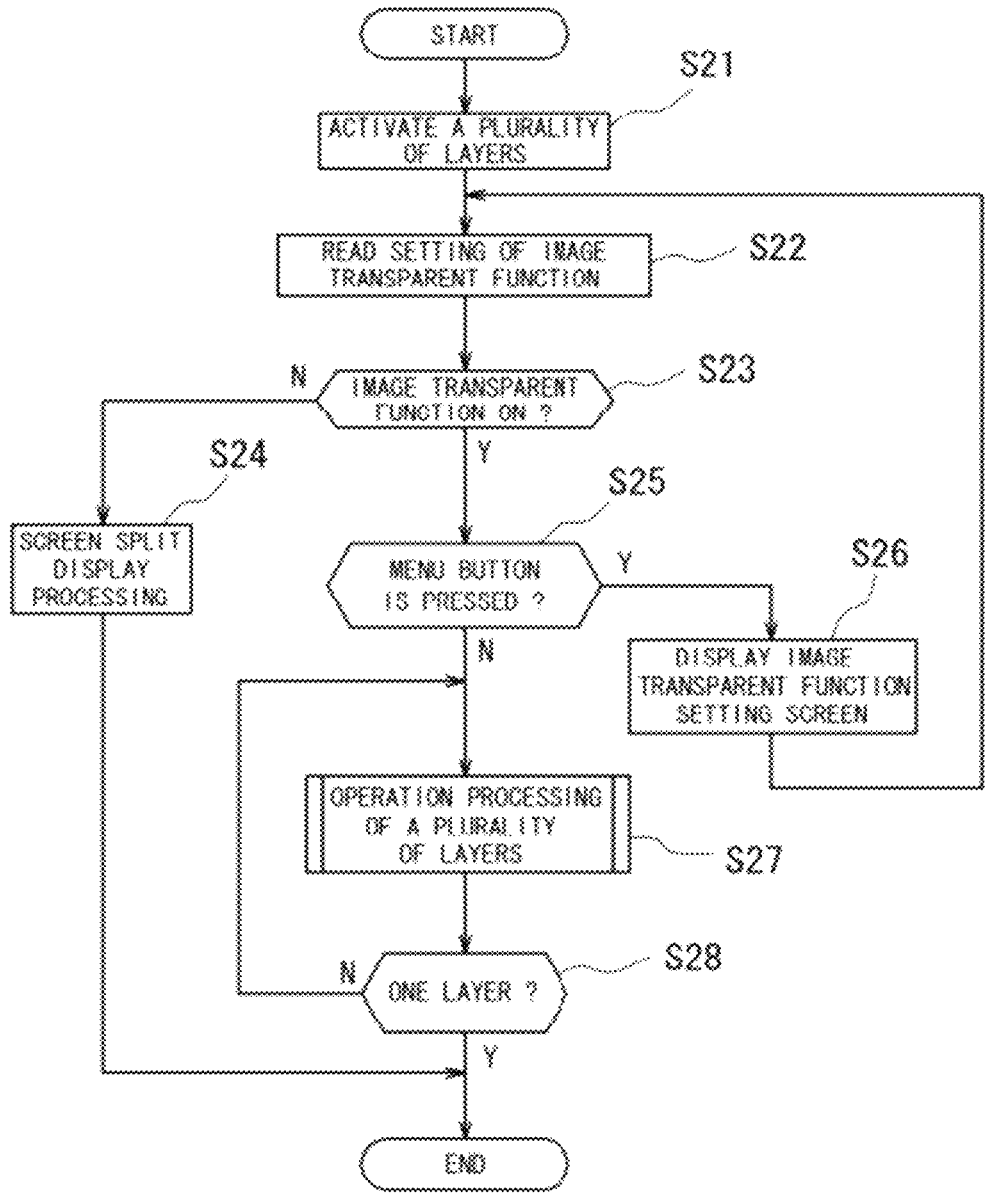
FIG. 7 is a flowchart illustrating operation of the input apparatus of the mobile terminal shown in FIG. 1.

Next, operation of the input apparatus of the mobile terminal 10 in accordance with the present embodiment will be described below with reference to the flowchart shown in FIG. 7. This is to give further explanation of the operation example of the mobile terminal 10 when a plurality of layers are activated, including the above-described "multi-layer operation processing".

After the start, when a plurality of layers are activated by overlapping a new display screen on a display screen that has originally been activated at step S21, the control unit 19 reads the setting of the image transparent function from the storage unit 18 (step S22). When reading the setting of the image transparent function, in addition to the above-mentioned "image transparent ON/OFF", "layer transparency", "layer order" and "the maximum number of superimposed layers", various settings that have previously been performed such as a correspondence between each input mode and layer required for the above-mentioned "multi-layer operation processing" and display/hidden of a "menu key" described later are read.

Further, with respect to the "image transparent ON/OFF" included in the information read at step S22, the control unit 19 determines whether the function of superimposing display is used or not used (step S23). In the case where the image transparent OFF, that is, no superimposed display is set at step S23, a plurality of screens are displayed without using a plurality of layers. Therefore, the control unit 19 controls the display mode control unit 16 to display the screens by splitting the display region according to the setting (step S24).

Figure 8:
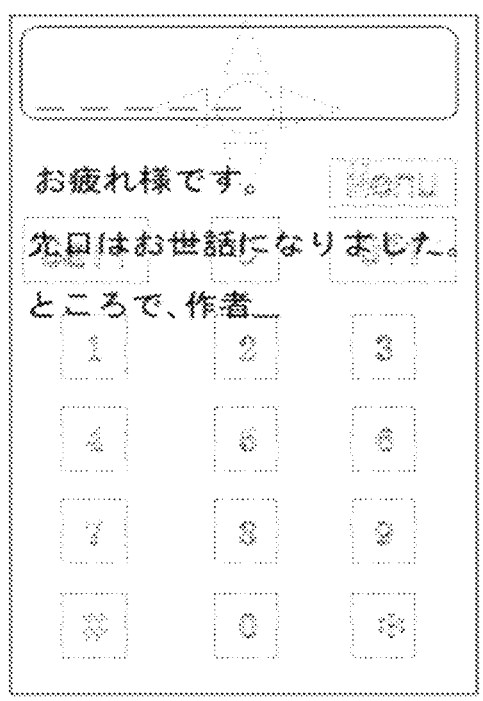
FIG. 8 is a diagram showing an example of a menu key display of the input apparatus of the mobile terminal shown in FIG. 1.

In the case where the image transparent ON is set at step S23, the control unit 19 controls the display mode control unit 16 so that a plurality of layers are superimposed one another according to the setting, and in the case where the menu key is set to be displayed on the display unit 11, determines whether or not the menu key is pressed (step S25). The menu key is displayed, for example, as an input area on the upper right part of the operation layer as shown in FIG. 8. When this menu key is pressed at step S25, the control unit 19 controls the display mode control unit 16 to display a setting screen on which various settings of the above-described "image transparent function" can be performed (step S26). In addition, it is preferable that this menu key is transited to a hidden state after a certain period of time and is redisplayed in response to a special input such as trace of an edge of the touch panel 12. In this way other displays are not disturbed. After setting is performed on the setting screen at step S26, the control unit 19 returns the process to step S22 and reads the setting from the storage unit 18.

Figure 5:
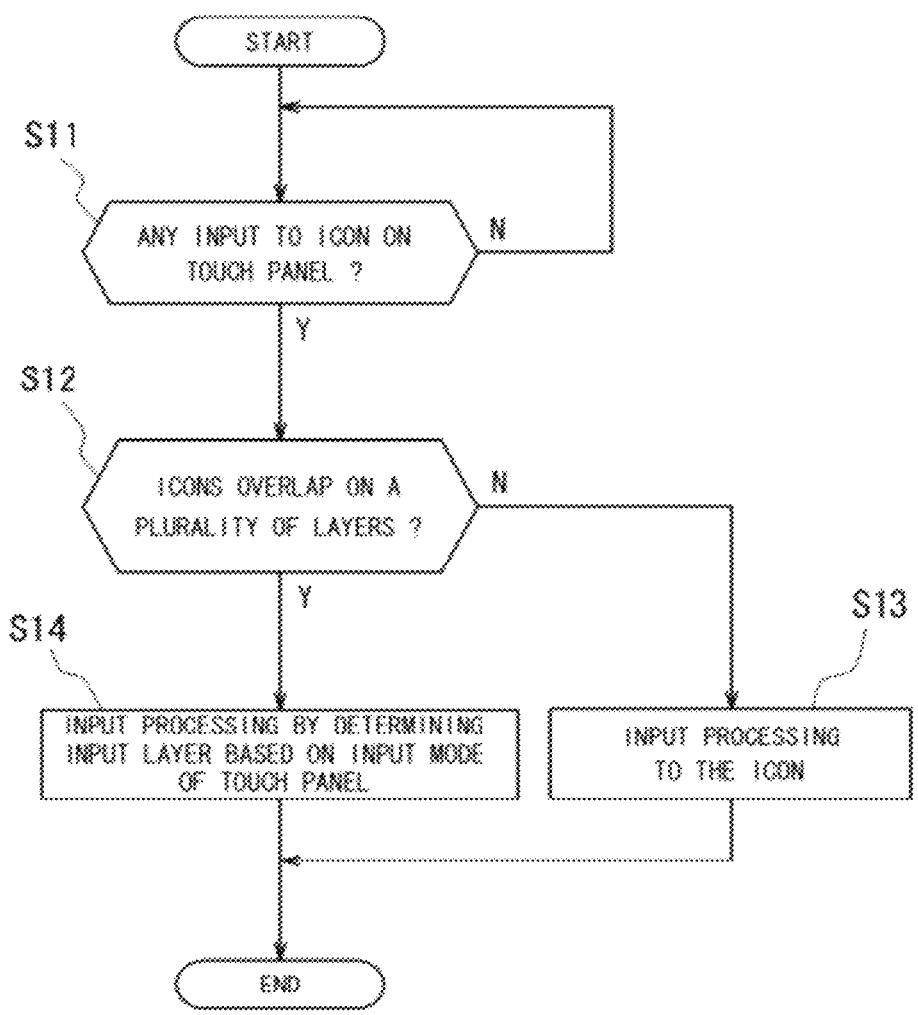
FIG. 5 is a flowchart illustrating an multi-layer operation processing by the input apparatus of the mobile terminal shown in FIG. 1.

When the menu key is not pressed at step S25, the control unit 19 proceeds to step S27 and performs "multi-layer operation processing" illustrated in the flowchart of FIG. 5. During a series of input operation, there are some cases where an additional layer is activated since a user activates an application, while there are some cases where a layer that is no longer needed is eliminated in association with a termination processing of the application. At step S28, the control unit 19 checks the number of layers being currently activated and repeats the multi-layer operation processing of step S27 as long as the plurality of layers are activated. On the other hand, when it is determined that the plurality of layers are no longer activated, the control unit 19 terminates the processing for controlling input of the plurality of layers in association with the superimposed display.

In this way, the setting of the image transparent function can occasionally be changed during a series of input processing including the "multi-layer operation processing" at the time of activation of a plurality of layers, and depending on the function to be used, superimposed display of layers or split display of screen can be chosen. Thus the user can obtain an extremely easy-to-use operation environment.

It should be noted that the present invention is not limited to the above-described embodiment, but various modifications and changes are available. For example, in the above-described embodiment, it is determined whether a position of an input area where an input is detected overlaps a plurality of input areas displayed on a plurality of layers in the "multi-layer operation processing". Then when it overlaps, to which layer the input is performed is determined. However, as another example, it is possible to perform processing based on the correspondence between the input mode and the layer that is previously set, regardless of whether or not the input area where the input is detected overlaps another input area displayed on the plurality of layers.

In other words, the mobile terminal 10 can be designed so that when the input of the first mode (e.g. a simple one-time press) is performed to the touch panel 12, it is always determined and processed as an input to the first layer and when the input of the second mode (e.g. a slide input) is performed, it is always determined and processed as an input to the second layer. Depending on the function used by the mobile terminal 10, it may be preferable that operation method is fixed to each layer as described above.

In addition, in the above mentioned embodiment, for convenience of explanation, the number of layers to be superimposed is defined as 2. However, it is obvious that more than or equal to 3 layers can be superimposed. In such case, it is preferable to change the transparency of each of more than or equal to 3 layers gradually as a whole so as to display the layers to be visible even if the plurality of layers are superimposed and to correspond different input modes to each layer.

(Embodiment in the Case of English)

Another embodiment of the invention in the case of English will be described below with reference to the drawings. It should be noted that although in the following embodiment, explanation is given by taking a mobile terminal such as a PDA and the like as an example of a terminal having an input apparatus, the input apparatus according to the present invention is not applied to a mobile terminal only, but can be applied to any terminals as well as, for example, a stationary-type input apparatus if it is a terminal having an input unit including a touch panel.

FIG. 1 is an appearance perspective view showing a schematic configuration of a mobile terminal 10 having an input apparatus in accordance with the embodiment of the present invention. The mobile terminal 10 has a display unit 11 on the front face of the terminal body as shown by a notch, for displaying various information and arrangements of keys, buttons and the like by drawing their shapes on a liquid crystal screen, and a touch panel 12 having a matrix switch and the like, which directly accepts input by the user's finger and the like and is disposed on the front of the display unit 11. The mobile terminal 10 further includes a key input unit 13 having at least one mechanical key, a speaker 14 for outputting voice and a microphone 15 for accepting input of voice. Other than that, the mobile terminal 10 may include a digital camera function unit, a tuner for one-segment broadcasting, a near-field communication unit such as an infrared communication function unit and various interfaces and the like according to necessary functions. However, drawing and explanation of the details thereof are omitted.

The mobile terminal 10 in accordance with the present invention displays various key shapes and arrangements as images on the display unit 11. When the user presses an image portion where a key is displayed, which means, the user presses the touch panel 12 corresponding to the position, a transparent switch on the position where the touch panel 12 is pressed outputs a signal in response to the input.

FIG. 2 is a functional block diagram showing the internal construction of the mobile terminal 10 in accordance with the present embodiment. As described above, the mobile terminal 10 includes the display unit 11, the touch panel 12, the key input unit 13, the speaker 14 and the microphone 15. The mobile terminal 10 further includes a display mode control unit 16 for controlling a display mode such as superimposing an image on the display unit 11 as a layer, which is described later, so that a lower image is visible through the image, an input mode determination unit 17 for determining an input mode based on an input to the touch panel 12, a storage unit 18 for storing various information such as a plurality of templates used to display the shapes and the arrangements of keys and buttons for input on the display unit 11 according to each application and a control unit 19 for controlling and managing each of these blocks.

FIG. 12 is a diagram showing an example of a screen displayed on the display unit 11 of the mobile terminal 10. Here, as an example, a display mode of the display unit 11 for composing an e-mail message that is widely used is shown. FIG. 12(a) is a diagram showing the arrangement of operation key group necessary for the composition/edition of e-mail message which is read out from the storage unit 18 and displayed on the display unit 11 by the control unit 19, and FIG. 12(b) is a diagram displaying a screen for the composition/edition of e-mail message. Here, an e-mail composition function is explained as an example. However, the display unit 11 displays the display screen and the easy-to-use key arrangement suitable for the use of the function by reading them from the storage unit 18 based on the various templates according to each function of the mobile terminal 10.

The user inputs characters that compose an e-mail message by pressing the keys of operation key group displayed on the display unit 11 (actually by pressing the touch panel 12) as shown in FIG. 12(a). The input operation of the mobile terminal 10 is described below based on the character input method of e-mail that is generally used nowadays. That is, explanation is given based on the method in which each character from "A" to "Z" corresponds to respective number keys, such as "A, B, C" to key "2", "D, E, F" to key "3", "G, H, I" to key "4" and so on, and by pressing each number key repeatedly, a user can input a character by shifting a corresponding character according to the number of presses. (For example, when the user wants to input "H", he presses key "4" twice.)

In the display screen shown in FIG. 12(b), an area showing the character conversion process of an e-mail is displayed on the upper part and a confirmed portion of the characters inputted is displayed on the middle part. The figure shows a state where the user presses key "9 (W, X, Y, Z)" three times among the keys on the display unit 11 shown in FIG. 12(a) to input "Y", which is the third character of key "9". At the lower part of FIG. 12(b), selection candidates of various words starting from "Y" are displayed in response to the input of a character of "Y". The user can choose one from among the displayed words and confirm it.

Figure 16:
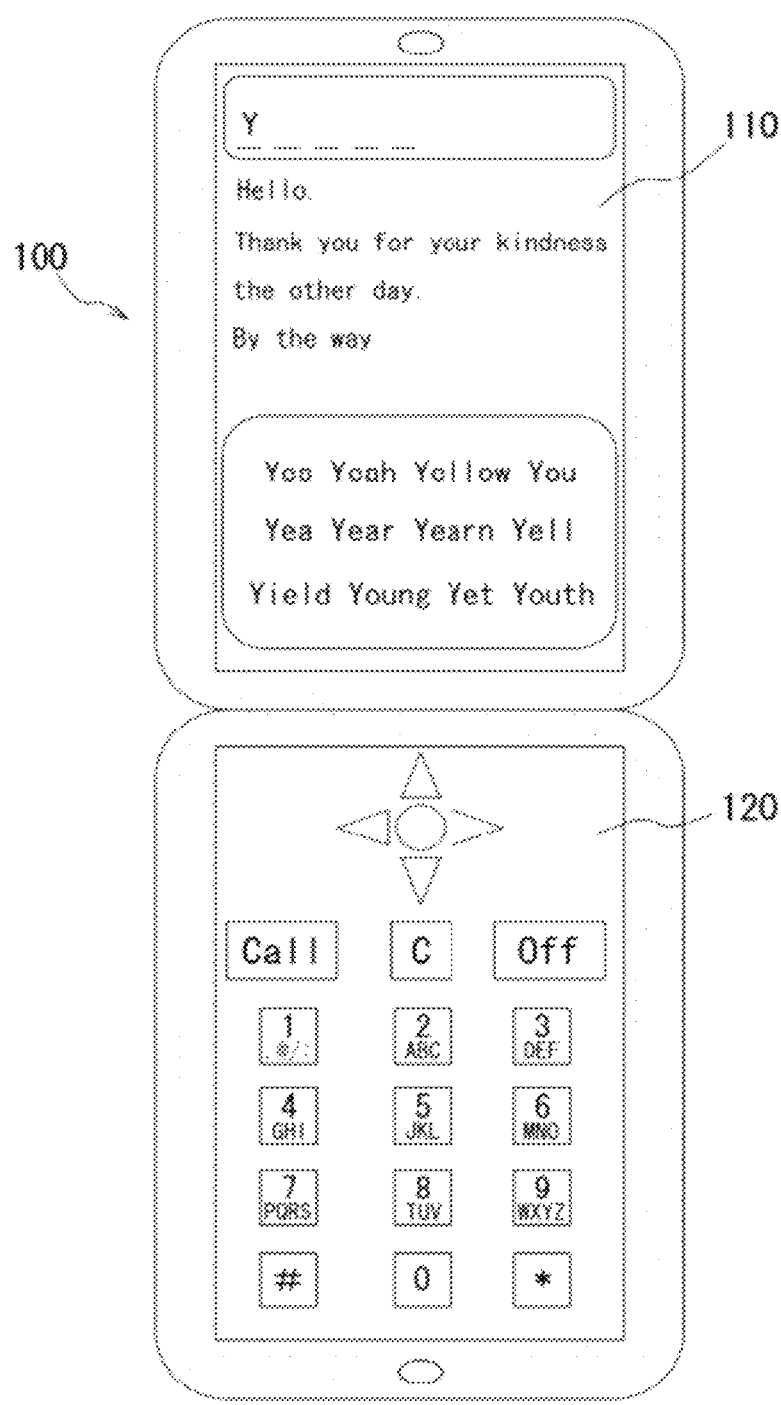
FIG. 16 is a diagram showing an English example of the conventional two-screen type mobile terminal.
Figure 17:
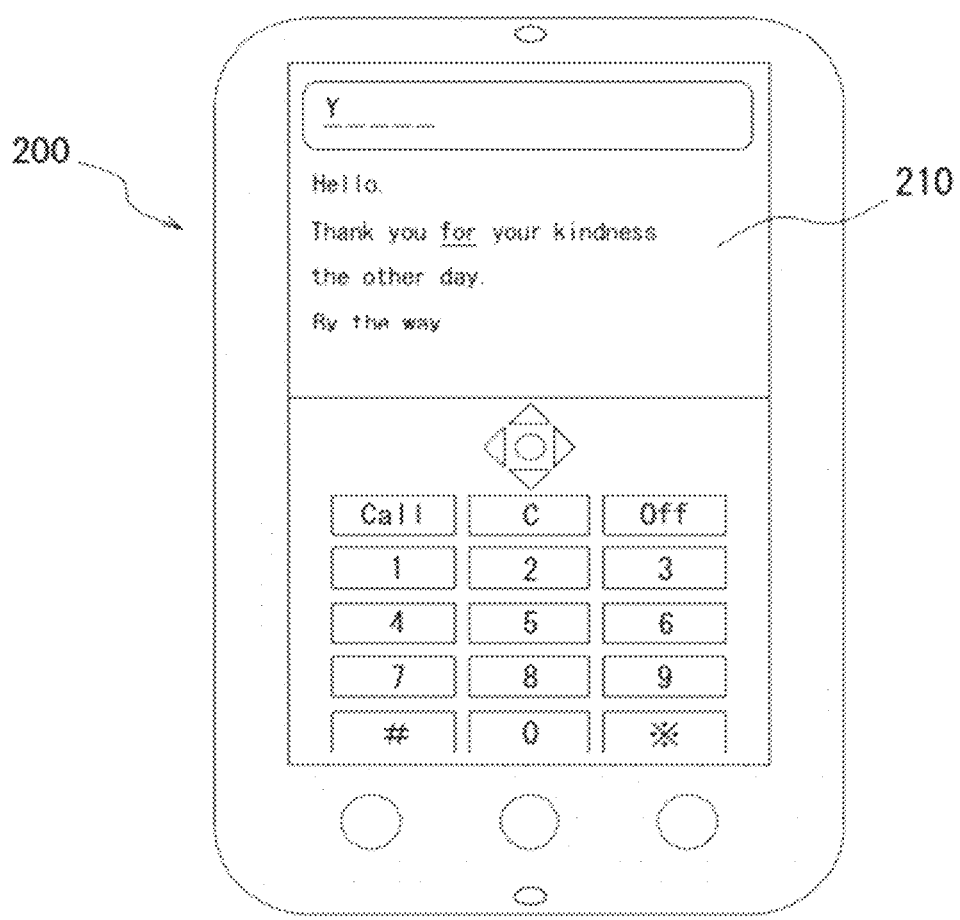
FIG. 17 is a diagram showing an English example of the conventional one-screen type mobile terminal.

When display screens such as shown in FIG. 12(a) and FIG. 12(b) described above are displayed on the display unit 11 of the mobile terminal 10, for example, in the case of the mobile terminal having a plurality of display units 110 and 120 as illustrated in FIG. 16, the operation key screen of FIG. 12(a) can be displayed on the key display unit 120 having a touch panel and the e-mail composition/edition screen of FIG. 12(b) can be displayed on the information display unit 110. However, in the case where there is only one display unit 11 as in the case of the mobile terminal 10 of the present embodiment, two screens must be displayed on one display unit. In such case, as in the mobile terminal 200 of FIG. 17, for example, each screen can be displayed by splitting the display region of one display unit 210. However, when displaying like this, the size of each screen should be reduced for display and the limited display space of the display unit cannot be utilized effectively, which may considerably deteriorate the usability of the display unit 110 used as a display unit or an input unit for some functions of the mobile terminal to be used.

Consequently, in the present embodiment, the display mode control unit 16 controls the display unit 110 so that each display screen can be viewed through overlying display screen(s) even if a plurality of display screens overlap one another without reducing the size of each display screen. Hereinafter, in the case where a plurality of display screens are superimposed, each display screen constituting the plurality of display screens is conceptually referred to as a "layer". In addition, for convenience of explanation, the display screen on which the operation key as shown in FIG. 12(a) is displayed is referred to as an "operation layer" and the display screen on which the operation result as shown in FIG. 12(b) is displayed is referred to as a "display layer".

FIG. 13 is a diagram showing an example in which layers shown in FIG. 12(a) and FIG. 12(b) are superimposed one another. When one layer is overlapped on another layer as it is, the display screen of the lower layer cannot be viewed. Therefore, the display mode control unit 16 superimposes one layer on another so that the lower layer is visible through the upper layer by changing the transparency of the display screen of the upper layer. FIG. 13(a) is a diagram showing the display layer superimposed on the operation layer, and FIG. 13(b) is a diagram showing the operation layer superimposed on the display layer. In this manner, since both of the two layers can be viewed by superimposing one layer to another so that the lower layer is visible through the upper layer, there is no need for reducing the size of the display of each layer. Thus the display space of the display unit 11 can effectively be used without disturbing the layout of each layer.

Further, the display mode control unit 16 controls the display unit 110 to display layers in various modes according to the setting stored in the storage unit 18 when one layer is superimposed on another. For example, the display mode control unit 16 controls the display unit 110 to allow various settings such as an "image transparent ON/OFF" to set previously whether or not to user the above-illustrated function for superimposing an image so that a lower image is visible through the image, a "layer transparency" to set the transparency degree of a layer, a "layer order" to set the superimposing order of a plurality of layers, a "maximum number of superimposed layers" to set the maximum number of superimposed layers and the like. The display mode control unit 16 may be configured such that when the layers exceeding the "maximum number of the superimposed layers" are activated, the layer which is activated first is hidden, that is, the layer is placed in a sleep mode, and redisplayed by cancelling the sleep mode of the layer when the display of another layer is finished. In this embodiment, it is preferable that the layer transparency and the order of the layers are set as shown in FIG. 13(b) since a user can operate the operation key if only outline of the arrangement can be viewed. However, it is possible to set the mode for each user to use in the easiest manner corresponding to each function of the mobile terminal 10.

As described above, when layers are superimposed, if icons, buttons, keys and the like, which are input areas displayed on the layers, do not overlap each other on the same position of the plurality of layers, input operation to each layer can be accepted without any particular problem. However, in the case where input areas overlap each other on the same position of the plurality of layers, if the user presses the position of the input area, the touch panel 12 cannot determine to which layer's input area superimposed the input is intended.

In other words, in FIG. 13, for example, with respect to key "3" and the character of "Year" among the selection candidates, it is possible to determine correctly to which layer's input area the input is intended based on the position where the input is performed on the touch panel 12 since the position of input area does not overlap on each layer if the press operation is performed on either a layer shown in FIG. 13(a) or a layer shown in FIG. 13(b). However, for key "#" or the character of "Yield" among the selection candidates, since they locate almost on the same position on the touch panel 12 if the press operation is performed on either a layer shown in FIG. 13(a) or a layer shown in FIG. 13(b), there will be some cases where to which input area the input is intended cannot be determined based on the pressed position.

Therefore, in the present embodiment, the mobile terminal 10 performs "multi-layer operation processing" which enables determination of an input as an input to a predetermined input area even if input areas overlap each other when a plurality of layers are superimposed.

The multi-layer operation processing by the input apparatus of the mobile terminal 10 in accordance with the present embodiment will be described below with reference to the flowchart shown in FIG. 5. It should be noted that the multi-layer operation processing is performed on the basis that a plurality of layers are superimposed one another on the display unit 11. In addition, input modes are stored previously in the storage unit 18 so that the input mode determination unit 17 can determine to which layer the input is intended when the user performs input to an input area on the touch panel 12.

With respect to the input modes referred to here, there may be various modes such as a normal one-time press input, a long press input, a quick double-click input, an input by sliding one's finger while pressing, an input by flicking one's finger and an input by tracing one's finger around an icon to be chosen. Particularly, the input such as sliding one's finger can be handled as a separate mode according to the sliding direction (e.g. the slide from up to down is handled as a first input mode, and the slide from down to up is handled as a second input mode). Correspondence between each of these input modes and each layer is previously stored in the storage unit 18.

First, when an input to a portion of touch panel 12 corresponding to an input area displayed on the display unit 11 is detected at step S11, the control unit 19 determines whether or not the position of the input area where the input is detected overlaps another among a plurality of input areas on the plurality of layers displayed with reference to the key arrangements of each layer stored in the storage unit 18 (step S12). Even if there is a plurality of layers, when there is no overlap with the input area, it is considered that the user intends to input to the input area. Therefore, the control unit 19 performs a corresponding process assuming that the input is performed to the input area (step S13).

In the case where the position of the input area where the input is detected overlaps an input area of another layer at step S12, the control unit 19 determines to which layer the input is performed based on the information of the input mode determined by the input mode determination unit 17, and performs processing assuming that the input operation is performed to the input area of the layer indicated by the determination result (step S14).

Therefore, with respect to the portion where input areas overlap each other, for example, in the case where a normal one-time press is set as an input to the operation layer, if the user desires to perform input to key "6" as shown in FIG. 14(a) and performs input by pressing key "6" once, the control unit 19 processes the input as an input of "6" to the operation layer based on the determination by the input mode determination unit 17. In addition, for the portion where the input areas overlap each other, in the case where an input by sliding one's finger while pressing is set as an input to the display layer, if the user desires to choose the word of "You" and performs input by sliding his finger on the position where "You" is displayed as shown in FIG. 14(b), based on the determination by the input mode determination unit 17, the control unit 19 processes the input as a choice of "You" on the display layer. Therefore, in the present embodiment, an input mode determination unit is configured by including the input mode determination unit 17 and the storage unit 18. Further, a superimposed area input detection unit is configured by including the touch panel 12, the display mode control unit 16 and the control unit 19. The control unit 19 also includes an input control unit.

In this manner, in the present embodiment, for the input areas of a plurality of layers located on the same position with respect to the touch panel 12, a user can input to any layer directly by performing the input operation differently for each layer regardless of a state of the superimposed display on the display unit 11 (whichever layer is displayed on top). Therefore, neither choice of a layer to be activated each time an input is performed nor switching of a layer is necessary anymore.

In the present embodiment, a result based on input to a layer can be displayed on another layer by reflecting it, for example, the result of the input to the "operation layer" is reflected to the display on the "display layer". For example, when key "2 (A, B, C)" is pressed on the operation layer, the control unit 19 first controls the operation layer to make a confirmation display indicating that key "2 (A, B, C)" is pressed (e.g. momentary highlighting), and then, performs processing to output the character "A" on the display layer based on the input. Therefore, in the present embodiment, a display control unit includes the display mode control unit 16 and the control unit 19.

Figure 14:
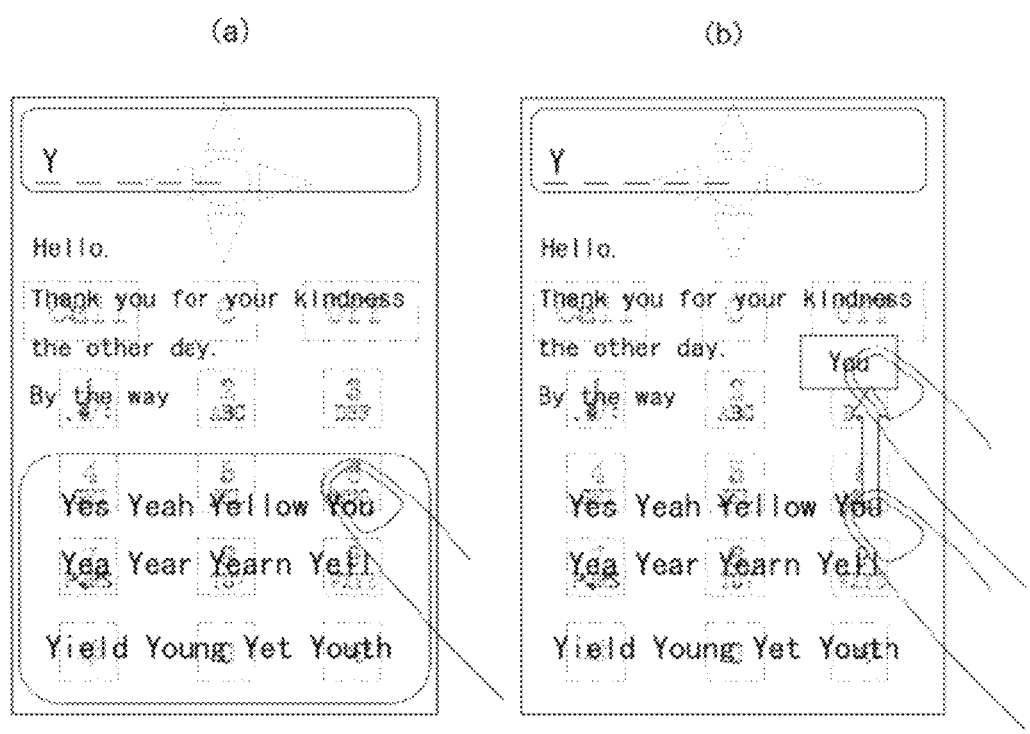
FIG. 14 is a diagram illustrating an English example of an input method with respect to each layer of the input apparatus of the mobile terminal shown in FIG. 1.

Moreover, in the case where various selection candidates of words are displayed on the lower part of the display layer in response to the input of characters and the user select one from the candidates at the stage of composition of e-mail as shown in FIG. 14, in the conventional method, the user normally select a conversion candidate using an arrow key displayed on the upper part of the operation layer. However, in the mobile terminal 10 in accordance with the present embodiment, a plurality of layers are superimposed one another and a user can input to a layer directly. Thus the user, when selecting a candidate as described above, can directly select one from the selection candidates by performing input in an input mode corresponding to the display layer. Therefore, the user can make full use of the merit of using an input unit having a touch panel.

Further, in case the input mode determination unit 17 cannot determine which layer a mode of input performed by the user corresponds to, a priority of input to each layer can be set previously. In other words, for example, in the case where the normal one-time press operation is determined as an input to the operation layer and the slide input is determined as an input to the display layer, when the input mode determination unit 17 cannot determine whether the user input is one-time press or slide input, it is possible, for example, to previously perform setting so that the user input is determined as an input to the display layer first. Moreover, in the case where a mode of an input operation to the layer appeared first is set as a normal one-time press, for example, the mode of the input operation to the layer appeared next is different from the normal one-time press. Therefore, in the case where an input cannot be recognized as a normal one-time press which is considered to be determined easily, it is possible to set first so that the input is determined to be an input to the layer appeared later.

Next, operation of the input apparatus of the mobile terminal 10 in accordance with the present embodiment will be described below with reference to the flowchart shown in FIG. 7. This is to give further explanation of the operation example of the mobile terminal 10 when a plurality of layers are activated, including the above-described "multi-layer operation processing".

After the start, when a plurality of layers are activated by overlapping a new display screen on a display screen that has originally been activated at step S21, the control unit 19 reads the setting of the image transparent function from the storage unit 18 (step S22). When reading the setting of the image transparent function, in addition to the above-mentioned "image transparent ON/OFF", "layer transparency", "layer order" and "the maximum number of superimposed layers", various settings that have previously been performed such as a correspondence between each input mode and layer required for the above-mentioned "multi-layer operation processing" and display/hidden of a "menu key" described later are read.

Further, with reference to the "image transparent ON/OFF" included in the information read at step S22, the control unit 19 determines whether the function for superimposing display is used or not used (step S23). In the case where the image transparent OFF, that is, no superimposed display is set at step S23, a plurality of screens are displayed without using a plurality of layers. Therefore, the control unit 19 controls the display mode control unit 16 to display the screens by splitting the display region according to the setting (step S24).

Figure 15:
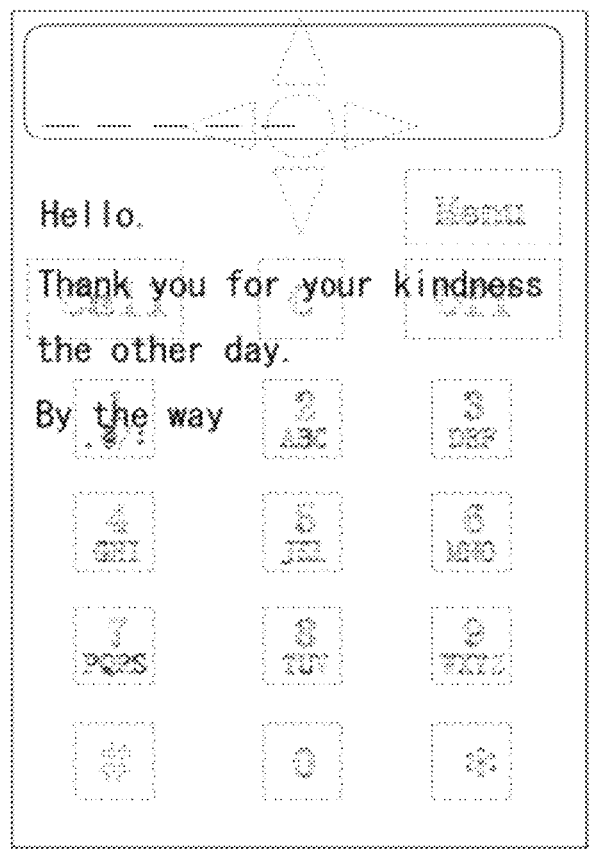
FIG. 15 is a diagram illustrating an English example of a menu key of the input apparatus of the mobile terminal shown in FIG. 1.

In the case where the image transparent ON is set at step S23, the control unit 19 controls the display mode control unit 16 so that a plurality of layers are superimposed one another according to the setting, and in the case where the menu key is set to be displayed on the display unit 11, determines whether or not the menu key is pressed (step S25). The menu key is displayed, for example, as an input area on the upper right part of the operation layer as shown in FIG. 15. When this menu key is pressed at step S25, the control unit 19 controls the display mode control unit 16 to display a setting screen on which various settings of the above-described "image transparent function" can be performed (step S26). In addition, it is preferable that this menu key is transited to a hidden state after a certain period of time and is redisplayed in response to a special input such as trace of an edge of the touch panel 12. In this way other displays are not disturbed. After setting is performed on the setting screen at step S26, the control unit 19 returns the process to step S22 and reads the setting from the storage unit 18.

When the menu key is not pressed at step S25, the control unit 19 proceeds to step S27 and performs "multi-layer operation processing" illustrated in the flowchart of FIG. 5. During a series of input operation, there are some cases where an additional layer is activated since a user activates an application, while there are some cases where a layer that is no longer needed is eliminated in association with a termination processing of the application. At step S28, the control unit 19 checks the number of layers being currently activated and repeats the multi-layer operation processing of step S27 as long as the plurality of layers are activated. On the other hand, when it is determined that the plurality of layers are no longer activated, the control unit 19 terminates the processing for controlling input of the plurality of layers in association with the superimposed display.

In this way, the setting of the image transparent function can occasionally be changed during a series of input processing including the "multi-layer operation processing" at the time of activation of a plurality of layers, and depending on the function to be used, superimposed display of layers or split display of screen can be chosen. Thus the user can obtain an extremely easy-to-use operation environment.

It should be noted that the present invention is not limited to the above described embodiment, but various modifications and changes are available. For example, in the above embodiments, it is determined whether a position of an input area where an input is detected overlaps another among a plurality of input areas displayed on a plurality of layers in the "multi-layer operation processing". Then when it overlaps, to which layer the input is performed is determined. However, as another example, it is possible to perform processing based on the correspondence between the input mode and the layer that is previously set, regardless of whether or not the input area where the input is detected overlaps another input area displayed on the plurality of layers.

In other words, the mobile terminal 10 can be designed so that when the input of the first mode (e.g. a simple one-time press) is performed to the touch panel 12, it is always determined and processed as an input to the first layer and when the input of the second mode (e.g. a slide input) is performed, it is always determined and processed as an input to the second layer. Depending on the function used by the mobile terminal 10, it may be preferable that operation method is fixed to each layer as described above.

In addition, in the above mentioned embodiment, for convenience of explanation, the number of layers to be superimposed is defined as 2. However, it is obvious that more than or equal to 3 layers can be superimposed. In such case, it is preferable to change the transparency of each of more than or equal to 3 layers gradually as a whole so as to display the layers to be visible even if the plurality of layers are superimposed and to correspond different input modes to each layer.

INDUSTRIAL APPLICABILITY

According to the present invention, a plurality of layers including the first and second layers are superimposed one another on a display unit, which will maximize the use of the display area of each layer. Further, the present invention enables distinction of input to the first and the second layers. Therefore, it is possible to make the most of the functions of the display unit and the input unit of the input apparatus and user convenience can be remarkably improved.

The invention claimed is:

1. An input apparatus, comprising:
a display unit for displaying a screen composed of a plurality of layers including a first layer for displaying at least one input area and a second layer for displaying at least one input area, wherein the second layer is different from the first layer;
a touch panel arranged in association with the display unit and for detecting an input to the input area displayed on the display unit;
an input mode determination unit for determining whether an input mode to the touch panel is a first input mode or a second input mode, in response to a detected sliding direction on the touch panel, wherein a first predetermined sliding direction corresponds to the first input mode and is different from a second predetermined sliding direction corresponding to the second input mode;
a superimposed area input detection unit for detecting an input to a superimposed area where the input area displayed on the first layer and the input area displayed on the second layer are superimposed; and
an input control unit for processing, in a case where the superimposed area input detection unit detects an input to the superimposed area, the input as an input to the input area displayed on the first layer when the input mode is determined as the first input mode by the input mode determination unit, and the input as an input to the input area displayed on the second layer when the input mode is determined as the second input mode by the input mode determination unit.

2. An input apparatus, comprising:
a display unit for displaying a screen composed of a plurality of layers including a first layer for displaying at least one input area and a second layer for displaying at least one input area, wherein the second layer is superimposed with but different from the first layer;
a touch panel arranged in association with the display unit for detecting an input to the input area displayed on the display unit;
an input mode determination unit for determining a first input mode to the first layer and a second input mode to the second layer with respect to the touch panel, in response to a detected sliding direction on the touch panel, wherein a first predetermined sliding direction corresponds to the first input mode and is different from a second predetermined sliding direction corresponding to the second input mode; and
an input control unit for processing, when an input mode is determined as the first input mode by the input mode determination unit, the input as an input to the input area displayed on the first layer, and when the input mode is determined as the second input mode by the input mode determination unit, the input as an input to the input area displayed on the second layer.

3. The input apparatus according to claim 1, further comprising a display control unit for controlling, in response to an input to the input area displayed either on the first or the second layer, display on a predetermined display area of the other layer.

4. The input apparatus according to claim 2, further comprising a display control unit for controlling, in response to an input to the input area displayed either on the first or the second layer, display on a predetermined display area of the other layer.

5. An input apparatus, comprising:
- a display unit for displaying a screen composed of a plurality of layers including a first layer for displaying at least one input area and a second layer for displaying at least one input area, wherein the second layer is superimposed with but different from the first layer;
- a touch panel arranged in association with the display unit for detecting an input to the input area displayed on the display unit;
- an input mode determination unit for determining, in response to a detected sliding direction on the touch panel, a first input mode to the first layer, the first input mode being indicated by a sliding touch in a first predetermined direction with respect to the touch panel, and a second input mode to the second layer, the second input mode being indicated by a sliding touch in a second predetermined direction with respect to the touch panel, the second predetermined direction being different from the first predetermined direction; and
- an input control unit for processing, when an input mode is determined as the first input mode by the input mode determination unit, the input as an input to the input area displayed on the first layer, and when the input mode is determined as the second input mode by the input mode determination unit, the input as an input to the input area displayed on the second layer.

* * * * *